US012705810B2

(12) United States Patent
Tian et al.

(10) Patent No.: US 12,705,810 B2
(45) Date of Patent: Aug. 11, 2026

(54) REAL TIME FILM GRAIN RENDERING AND PARAMETER ESTIMATION

(71) Applicant: Northwestern University, Evanston, IL (US)

(72) Inventors: Daizong Tian, Evanston, IL (US); Jingxian Wang, Evanston, IL (US); Kaixuan Zhang, Evanston, IL (US); Thrasyvoulos N. Pappas, Evanston, IL (US)

(73) Assignee: Northwestern University, Evanston, IL (US)

( * ) Notice: Subject to any disclaimer, the term of this patent is extended or adjusted under 35 U.S.C. 154(b) by 143 days.

(21) Appl. No.: 18/608,381

(22) Filed: Mar. 18, 2024

(65) Prior Publication Data

US 2024/0312091 A1 Sep. 19, 2024

Related U.S. Application Data

(60) Provisional application No. 63/490,545, filed on Mar. 16, 2023.

(51) Int. Cl.
*G06T 11/00* (2026.01)
*G06T 11/60* (2006.01)

(52) U.S. Cl.
CPC .................................... *G06T 11/60* (2013.01)

(58) Field of Classification Search
CPC ........................................................ G06T 11/60
See application file for complete search history.

(56) References Cited

U.S. PATENT DOCUMENTS

| | | | | |
|---|---|---|---|---|
| 9,438,821 B1* | 9/2016 | Parker | H04N 5/265 |
| 2007/0269125 A1* | 11/2007 | Llach | H04N 19/136 375/E7.193 |
| 2010/0080455 A1* | 4/2010 | Gomila | H04N 19/467 382/162 |
| 2014/0354885 A1* | 12/2014 | Hepper | G06T 5/70 348/607 |
| 2016/0373659 A1* | 12/2016 | Parker | G06T 7/11 |

OTHER PUBLICATIONS

Norkin, Andrey, and Neil Birkbeck. "Film grain synthesis for AV1 video codec." 2018 *Data Compression Conference*. IEEE, 2018; pp. 1-10.

Newson, Alasdair, et al. "Realistic film grain rendering." *Image Processing on Line* 7 (2017): 165-183.

Newson, Alasdair, Julie Delon, and Bruno Galerne. "A Stochastic Film Grain Model for Resolution-Independent Rendering." *Computer Graphics Forum*. vol. 36. No. 8. 2017; pp. 1-15.

* cited by examiner

*Primary Examiner* — Terrell M Robinson
(74) *Attorney, Agent, or Firm* — Bell & Manning, LLC

(57) ABSTRACT

A method for film grain rendering includes receiving, by a computing system a first image. The method also includes modeling, by a processor of the computing system, film grains for the image. The method also includes deriving, by the processor, second order statistics for the film grains. The method also includes synthesizing, by the processor and based at least in part on the second order statistics, the film grains as correlated signal dependent noise. The method further includes rendering, by the processor, a second image that corresponds to the first image and that includes the synthesized film grains.

19 Claims, 14 Drawing Sheets

| Symbol | Interpretation (all units are in pixels) |
|---|---|
| $\mu_r$ | Mean of the grain radius |
| $\sigma_r$ | Standard deviation of the grain radius |
| $f_R(r)$ | Probability density of film grain radius |
| $\sigma$ | Standard deviation of the Gaussian filter $\phi$ |
| $\mathbf{p}$ | $\mathbf{p} \in \mathbb{R}^2$, continuous space variable |
| $\bar{\mathbf{p}}$ | $\bar{\mathbf{p}} \in \mathbb{Z}^2$, discrete pixel coordinate |
| $B$ | Random set, union of grains on $\mathbb{R}^2$ |
| $C_B(\mathbf{p}, x, r)$ | Covariance of the Boolean model $B$ |
| $\mathbb{1}_B(\mathbf{p})$ | Indicator function of $B$ at point $\mathbf{p} \in \mathbb{R}^2$. $\mathbb{1}_B(\mathbf{p}) = 1$ if $\mathbf{p}$ is covered by a grain. |
| $\phi(\mathbf{p})$ | Gaussian filter with mean 0 and variance $\sigma^2 I_2$. |
| $\tilde{B}(\mathbf{p})$ | Filtered Boolean model defined on $\mathbb{R}^2$ |
| $\tilde{B}[\bar{\mathbf{p}}]$ | Filtered Boolean model defined on $\mathbb{Z}^2$ |
| $\tilde{B}_q[\bar{\mathbf{p}}]$ | Quantized $\tilde{B}[\bar{\mathbf{p}}]$ to $q$ bits |

Fig. 1

| $\mu_r$ | $\sigma_r$ | $\sigma$ | $\|\Delta\|$ | $\min\{T(\mathbf{p}, \|\Delta\|)\}$ | $\max\{T(\mathbf{p}, \|\Delta\|)\}$ |
|---|---|---|---|---|---|
| 0.2 | 0.0 | 0.8 | 1 | 1.0026 | 1.0061 |
| 0.2 | 0.0 | 0.8 | 2 | 1.0104 | 1.0244 |
| 0.2 | 0.25 | 1.0 | 1 | 1.0015 | 1.0042 |
| 0.3 | 0.0 | 0.9 | 1 | 1.0036 | 1.0084 |
| 0.3 | 0.0 | 0.9 | 2 | 1.0146 | 1.0341 |
| 0.3 | 0.25 | 1.0 | 1 | 1.0032 | 1.0081 |
| 0.4 | 0.0 | 1.0 | 2 | 1.0169 | 1.0396 |
| 0.5 | 0.0 | 1.0 | 2 | 1.0262 | 1.0615 |
| 3.0 | 0.0 | 9.0 | 20 | 1.0146 | 1.0341 |

Fig. 3

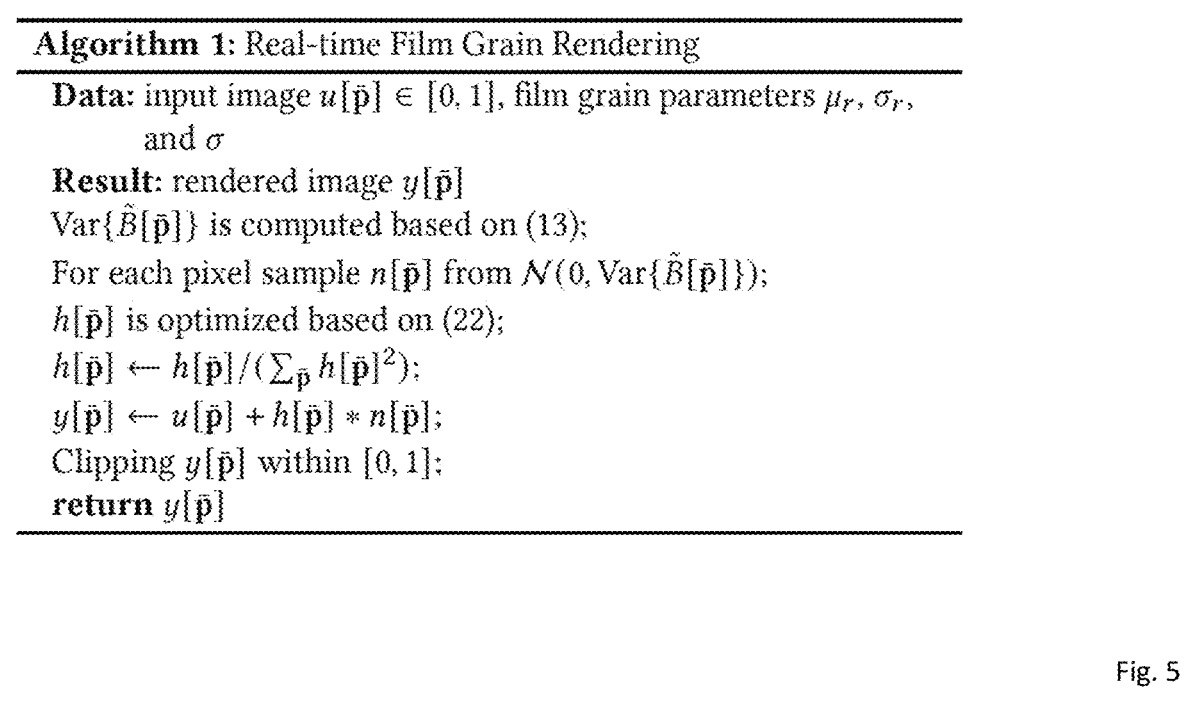

Algorithm 1: Real-time Film Grain Rendering

Data: input image $u[\bar{\mathbf{p}}] \in [0, 1]$, film grain parameters $\mu_r$, $\sigma_r$, and $\sigma$

Result: rendered image $y[\bar{\mathbf{p}}]$ $\mathrm{Var}\{\hat{B}[\bar{\mathbf{p}}]\}$ is computed based on (13);

For each pixel sample $n[\bar{\mathbf{p}}]$ from $\mathcal{N}(0, \mathrm{Var}\{\hat{B}[\bar{\mathbf{p}}]\})$;

$h[\bar{\mathbf{p}}]$ is optimized based on (22);

$h[\bar{\mathbf{p}}] \leftarrow h[\bar{\mathbf{p}}]/(\sum_{\bar{\mathbf{p}}} h[\bar{\mathbf{p}}]^2)$;

$y[\bar{\mathbf{p}}] \leftarrow u[\bar{\mathbf{p}}] + h[\bar{\mathbf{p}}] * n[\bar{\mathbf{p}}]$;

Clipping $y[\bar{\mathbf{p}}]$ within $[0, 1]$;

return $y[\bar{\mathbf{p}}]$

Fig. 5

Mean Pixel Value
Error of Pixel Value
Standard Deviation
Error of Standard Deviation
Input Pixel Value
Input Pixel Value
Theory
Newson's
Ours

| Method | Device | Time (sec) |
| --- | --- | --- |
| Newson *et al.* | CPU | $5 \times 10^4$ |
| | GPU | $3 \times 10^2$ |
| Proposed | CPU | $3 \times 10^{-2}$ |
| | GPU | $5 \times 10^{-4}$ |

Fig. 7

| $\mu_r$ | $\sigma$ | $\hat{\mu}_r$ | $\hat{\sigma}$ | Bits | Rendering algorithm |
|---|---|---|---|---|---|
| 0.050 | 1.2 | 0.050 ± 0.002 | 1.198 ± 0.023 | n/a | Proposed |
| 0.075 | 0.6 | 0.075 ± 0.001 | 0.600 ± 0.006 | n/a | |
| 0.100 | 0.8 | 0.100 ± 0.003 | 0.798 ± 0.010 | n/a | |
| 0.050 | 1.2 | 0.050 ± 0.002 | 1.198 ± 0.025 | 8 | |
| 0.075 | 0.6 | 0.075 ± 0.002 | 0.601 ± 0.013 | 8 | |
| 0.100 | 0.8 | 0.100 ± 0.003 | 0.799 ± 0.014 | 8 | |
| 0.050 | 1.2 | 0.048 ± 0.001 | 1.197 ± 0.018 | 8 | Newson *et al.* |
| 0.075 | 0.6 | 0.074 ± 0.002 | 0.605 ± 0.010 | 8 | |
| 0.100 | 0.8 | 0.098 ± 0.003 | 0.806 ± 0.014 | 8 | |

Fig. 9

| $\mu_r$ | $\sigma$ | $\hat{\mu}_r$ | $\hat{\sigma}$ | Bits | Rendering algorithm |
|---|---|---|---|---|---|
| 0.050 | 0.6 | 0.050 ± 0.001 | 0.600 ± 0.005 | n/a | Proposed |
| 0.100 | 0.8 | 0.099 ± 0.002 | 0.800 ± 0.009 | n/a | |
| 0.150 | 1.0 | 0.148 ± 0.005 | 1.001 ± 0.015 | n/a | |
| 0.050 | 0.6 | 0.050 ± 0.001 | 0.600 ± 0.011 | 8 | |
| 0.100 | 0.8 | 0.099 ± 0.003 | 0.799 ± 0.013 | 8 | |
| 0.150 | 1.0 | 0.147 ± 0.005 | 0.996 ± 0.017 | 8 | |
| 0.050 | 0.6 | 0.048 ± 0.001 | 0.579 ± 0.010 | 8 | Newson *et al.* |
| 0.100 | 0.8 | 0.095 ± 0.003 | 0.773 ± 0.014 | 8 | |
| 0.150 | 1.0 | 0.139 ± 0.004 | 0.954 ± 0.015 | 8 | |

Fig. 11

Standard Deviation
Correlation at ||Δ||=1
Input Pixel Value
Input Pixel Value
0.00
0.01
0.02
0.03
0.04
0.05
0.00
0.20
0.40
0.60
0.80
1.00
0.0
0.2
0.4
0.6
0.8
1.0
$\mu_r = 0.150, \sigma_r = 0.25, \sigma = 1.0$
$\hat{\mu}_r = 0.171, \hat{\sigma}_r = 0.00, \hat{\sigma} = 1.0$
$\mu_r = 0.100, \sigma_r = 0.50, \sigma = 1.0$
$\hat{\mu}_r = 0.167, \hat{\sigma}_r = 0.00, \hat{\sigma} = 1.0$

REAL TIME FILM GRAIN RENDERING AND PARAMETER ESTIMATION

CROSS-REFERENCE TO RELATED APPLICATION

The present application claims the priority benefit of U.S. Provisional Patent App. No. 63/490,545 filed on Mar. 16, 2023, the entire disclosure of which is incorporated herein by reference.

BACKGROUND

Digital photography has virtually eliminated the need for film capture of images because of the lower cost, case of use, and high image quality. However, many photographers and cinematographers still prefer the aesthetics of film because of its unique color palettes and the film grain texture, which is a byproduct of the silver-halide process used in film photography. The reasons for the film grain preference are not entirely understood, but have been attributed to several factors, including nostalgia and the perceived sharpness induced by a small amount of noise added to a still image or movie. Nevertheless, it is commonly desirable to create the film grain effect, either by the cumbersome use of film or by digital simulation.

SUMMARY

An illustrative method for film grain rendering includes receiving, by a computing system a first image. The method also includes modeling, by a processor of the computing system, film grains for the image. The method also includes deriving, by the processor, second order statistics for the film grains. The method also includes synthesizing, by the processor and based at least in part on the second order statistics, the film grains as correlated signal dependent noise. The method further includes rendering, by the processor, a second image that corresponds to the first image and that includes the synthesized film grains.

In an illustrative embodiment, the second order statistics for the film grains include variance. In another embodiment, the second-order statistics for the film grains include correlation. In one embodiment, the deriving is performed based on an assumption that the first image has a constant value. In another embodiment, the method also includes deriving, by the processor, one or more formulas for film grain parameter estimation based at least in part on the derived second order statistics. In such an embodiment, the one or more formulas for film grain parameter estimation are based on an assumption of constant film grain radius.

In another embodiment, the method further includes identifying, by the processor, one or more portions of the first image that have a constant value, and wherein deriving the second order statistics is based on the one or more portions of the first image that have the constant value. In one embodiment, the film grains are modeled as a filtered Boolean model. In another embodiment, the synthesizing further comprises uniformly distributing the film grains throughout the first image. In one embodiment, each of the film grains includes a grain center, and the grain centers are distributed in accordance with a Poisson process that is based at least in part on a parameter $\lambda$ that controls grain density. In another embodiment, each of the film grains includes a radius, and the grain radii are identically and independent distributed throughout the first image. In such an embodiment, the radii are identically and independent distributed throughout the first image in accordance with a density function, and the radii are distributed independent of the grain centers.

An illustrative system for rendering film grain includes a memory that stores a first image. The system also includes a processor operatively coupled to the memory. The processor is configured to model film grains for the first image and derive second order statistics for the film grains. The processor is also configured to synthesize, based at least in part on the second order statistics, the film grains as correlated signal dependent noise. The processor is further configured to render a second image that corresponds to the first image and that includes the synthesized film grains.

In an illustrative embodiment, the second order statistics for the film grains include variance and correlation. In one embodiment, the processor is further configured derive one or more formulas for film grain parameter estimation based at least in part on the derived second order statistics. In another embodiment, the one or more formulas for film grain parameter estimation are based on an assumption of constant film grain radius. In another embodiment, the processor models the film grains as a filtered Boolean model. In one embodiment, each of the film grains includes a grain center, and the processor distributes the grain centers in accordance with a Poisson process. In another embodiment, each of the film grains includes a radius, and the processor identically and independent distributes the radii throughout the first image. In another embodiment, the radii are distributed throughout the first image in accordance with a density function, and the radii are distributed independent of the grain centers.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 1 is a table that includes important variables used to describe and define the proposed film grain rendering system in accordance with an illustrative embodiment.

FIG. 3 is a table that depicts results of calculating the range of $T(p, \|\Delta\|)$ with different film grain parameters in accordance with an illustrative embodiment.

FIG. 5 depicts a complete rendering algorithm for the system in accordance with an illustrative embodiment.

FIG. 7 is a table that compares the rendering time of the proposed and Newson et al. approaches in accordance with an illustrative embodiment.

FIG. 9 is a table that depicts the mean and standard deviation of the estimated parameters in accordance with an illustrative embodiment.

FIG. 11 is a table that includes results of the parameter estimation algorithm on the inhomogeneous image in accordance with an illustrative embodiment.

DETAILED DESCRIPTION

Figure 2A:
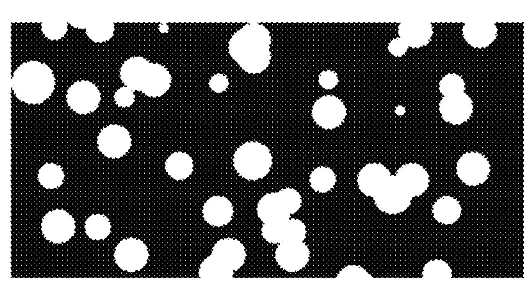
FIG. 2A depicts a Boolean model for film grain synthesis in accordance with an illustrative embodiment.

Described herein is a realistic film grain rendering algorithm based on statistics derived analytically from a physics-based Boolean model that has been adopted for Monte Carlo simulations of film grain. Also proposed are formulas for estimation of the model parameters from scanned film grain images. The proposed rendering is computationally efficient and can be used for real-time film grain simulation for a wide range of film grain parameters when the individual film grains are not visible. Experimental results demonstrate the effectiveness of the proposed approach for both constant and real-world images, for a six orders of magnitude speed-up compared with the Monte Carlo simulations of traditional approaches. More specifically, film grain is modeled as a filtered Boolean model. Based on that, second order statistics for the film grain noise are derived, including variance and correlation, based on the assumption that the image has constant value. Based on the derived statistics, film grain is synthesized as correlated signal dependent noise. Formulas for film grain parameter estimation are derived based on the second order film grain statistics. The proposed system implements the algorithms for film grain generation given an input image (grayscale or color) and the film grain parameters. The system can also estimate the film grain parameters given one or more scanned images with film grain.

Realistic film grain rendering is challenging due to the stochastic nature and signal dependence of film grain. A simple solution used in commercial products, such as FilmPack and TrueGrain, is to add a stored scanned image of film grain to the digital image. However, the synthesized film grain is not signal dependent, special care must be taken to ensure independence from frame to frame, and separate scans must be used for different grain sizes. Most of the existing work on film grain synthesis is data driven and completely ignores the film photographic process. Film grain is typically modeled as independent additive noise with signal-dependent variance. However, spatial correlation is important for realistic film grain synthesis.

Another option is to use an autoregressive model to characterize the spatial correlation of film grain. Estimating the model parameters of the film grain, denoising the image, and resynthesizing the film grain is important for image and video compression applications, whereby traditional compression algorithms require high bitrates due the stochastic nature of the film grain. However, autoregressive models are ad hoc, have no symmetric half-plane support, and may become unstable, resulting in severe artifacts. Others have used a texture synthesis algorithm to match the film grain characteristics of a film grain sample. Assuming the film grain noise can be extracted from a scanned image, this approach produces realistic film grain noise. However, it assumes the input image is homogeneous and thus cannot model signal dependency.

An alternative approach is to use a physics-based model of the silver-halide process for film grain synthesis. Doing so relies on Monte Carlo simulations to render an image with film grain at any resolution even when the individual grains are visible. This approach can generate realistic film grain. However, this process is computationally intensive because an accurate Monte Carlo simulation requires a large number of samples. The physical model-based Monte Carlo simulation is necessary for accurate film grain rendering when the resolution of the rendered image is so high that the grains are visible. At lower resolutions, where the grains are not visible, due to the limited resolution of the human eye, there is no need for a detailed Monte Carlo simulation.

Described herein are methods and systems that provide a realistic approximation of film grain appearance using statistics derived from the Boolean physical model of film grain noise. It is shown herein that the proposed approach is computationally efficient and can be used for real-time film grain simulation. In addition, described herein is an algorithm for estimating the film grain parameters from a scanned film grain image. More specifically, described herein are methods and systems for derivation of film grain statistics based on the physics-based film grain model, a real-time film grain rendering algorithm based on the derived film grain statistics, and a film grain parameter estimation algorithm where the estimated parameters are physical characteristics of the film grain.

Included below is an overview of research conducted in the field of film grain modeling, especially the physics-based film grain model. Following that is a derivation of the variance function and correlation function of the physics-based film grain model. Also included is a description of how to synthesize an image with film grain based on the derived statistics, and an image quantization model is described along with film grain parameter estimation. This is followed by an explanation of the experimental results that have been obtained and a conclusion. FIG. 1 is a table that includes important variables used to describe and define the proposed film grain rendering system in accordance with an illustrative embodiment.

Given an input image and desired output resolution, a goal of the present system is to synthesize signal-dependent correlated noise that accurately represents the appearance of film grain. It will be demonstrated that, under certain conditions, this can be achieved using statistics estimated based on a physical model of film grain noise, instead of a detailed Monte Carlo simulation. In such a case, signal-dependent correlated noise can be generated based on first and second order noise statistics.

Synthesis of signal-dependent correlated noise has been considered. Given a noise free discrete space image $u[\bar{p}]$, a standard model for synthesizing signal-dependent correlated noise is the following:

$$y[\bar{p}] = u[\bar{p}] + (n * h)[\bar{p}], \quad \text{Equation 1}$$

where $u[\bar{p}]$ and $y[\bar{p}]$ are the input and output images, $n[\bar{p}] \sim N(0, \sigma[\bar{p}]^2)$ is the signal-dependent noise, and $h[\bar{p}]$ is the filter. In the present application, brackets will be used for discrete variables and parenthesis will be used for continuous variables.

Physics-based film grain synthesis has also been considered. Prior researchers based their physics-based film grain rendering algorithm on the inhomogeneous Boolean model, which is a widely used model of film grain also known as the "random dot" model. The Boolean model is binary and includes randomly distributed, possibly overlapping, binary grains. The distribution of the grain centers is a Poisson process, which means that it is uniform and independent in the horizontal and vertical directions. The grain shape can range from disks to squares, triangles, polygons, etc. For purposes of the present application, it is assumed that the grains are in the shape of disks. The radii of the grains are independent, and are identically distributed according to a log-normal distribution that is independent of the grain centers. FIG. 2A depicts a Boolean model for film grain synthesis in accordance with an illustrative embodiment.

Figure 2B:
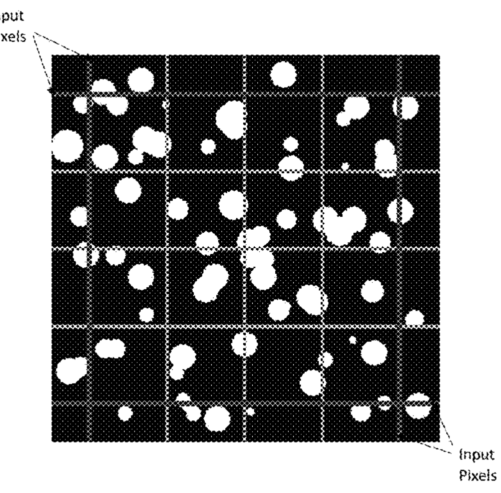
FIG. 2B depicts a Boolean model with input pixels and output pixels in accordance with an illustrative embodiment.

The physics-based film grain synthesis includes two steps. First, a binary, continuous-space, inhomogeneous Boolean model is generated. Then, the Boolean model is convolved with a Gaussian filter that models a combination of the human visual system and the optical conversion from a negative image to a positive image. A Monte Carlo simulation is used to estimate the outcome of the continuous convolution of the Boolean model with the Gaussian filter at each pixel of the output image. It is important to note that the final outcome of this approach is a discrete-space image. FIG. 2B depicts a Boolean model with input pixels and output pixels in accordance with an illustrative embodiment. Vertical and horizontal lines representing input pixels in FIG. 2B are labeled. The unlabeled vertical and horizontal lines in FIG. 2B represent output pixels. The zoom factor s represents the ratio of the number of output to input pixels, and s=4 in the figure.

The inhomogeneous Boolean film grain model is described in more detail below. One can let $B \subset \mathbb{R}^2$ denote the Boolean film grain model. The grains are uniformly distributed with centers at $\{x_i\}$ with radii $\{r_i\}$. The grain centers $\{x_i\}$ follow a Poisson process with parameter $\lambda$, and the radii $\{r_i\}$ are identically and independently distributed (i.i.d.) with density function $f_R(r)$ independent of grain centers $\{x_i\}$. The inventors choose $f_R(r)$ as a log-normal distribution with mean $\mu_r$ and variance $$\sigma_r^2.$$

One can let p be a point in $\mathbb{R}^2$ and let $1_B(p)$ be the indicator function of B, where $1_B(p)=1$ if p is covered by a grain and 0 otherwise. The following lemma can also be used. Lemma 2.1—The probability that p is not covered by any grain is given by: $\mathbb{P}(1_{\mathbb{B}}(p)=0)=e^{-\lambda\pi\mathbb{E}\{r_i^2\}}$, where $\mathbb{E}\{\bullet\}$ denotes the expected value. This means that no grain center is located in a disk with area $\pi\mathbb{E}$ $$\{r_i^2\}$$

centered a p.

The Boolean model is inhomogeneous when $\lambda(p)$ varies spatially with $p \in \mathbb{R}^2$. The physical meaning of $\lambda(p)$ is the density of grains around p. The value $\lambda(p)$ is used so that the expected value of the process p is equal to the gray level of the input image at $\bar{p}$, the coordinate of the pixel that contains p:

$$\mathbb{E}\{1_B(p)\} = \mathbb{P}(1_B(p) = 1) = u[\bar{p}], \quad \text{Equation 2}$$

where $u[\bar{p}] \in [0,1)$ is a normalized version of the input image. Using Lemma 2.1, one can find $\lambda(p)$ in terms of $u[\bar{p}]$ using Equation 3 below:

$$\lambda(p) = \frac{1}{\pi\mathbb{E}\{r_i^2\}}\log\left(\frac{1}{1-u[\bar{p}]}\right) \quad \text{Equation 3}$$

If the Boolean model is homogeneous, an expression for the covariance between $1_B(p)$ and $1_B(p+\Delta)$ can be:

Equation 4

$$C_B(p, \|\Delta\|, r_i) \triangleq \mathrm{Cov}\{1_B(p), 1_B(p+\Delta)\} = (1-u[\overline{p}])^2\left(e^{\lambda(p)\gamma(\|\Delta\|)} - 1\right)$$

In Equation 4, the explicit dependence on the random variable $r_i$ has been added, $\|\Delta\|$ is the distance between the two points, and $\gamma$ is given by:

Equation 5

$$\gamma(\|\Delta\|) = \int_{\frac{\|\Delta\|}{2}}^{\infty}\left(2x^2\cos^{-1}\left(\frac{\|\Delta\|}{2x}\right) - \frac{\|\Delta\|}{2}\sqrt{4x^2 - \|\Delta\|^2}\right) f_R(x)dx$$

The function $\gamma(\|\Delta\|)$ reflects the average overlap between grains centered at points located at a distance $\|\Delta\|$ from each other. This means that both $C_B(p, \|\Delta\|, r_i)$ and $\gamma(\|\Delta\|)$ are monotonically decreasing with $\|\Delta\|$, because as $\|\Delta\|$ increases, the overlap is less likely. If the grain radius is a constant $\mu_r$, then both functions become 0 when $\|\Delta\| \geq 2\mu_r$.

It is noted that Equation 4 is a function of the distribution of the grain radius. If one substitutes $sr_i$ for $r_i$ and $s\Delta$ for $\Delta$ in Equations 3-5, the following Lemma 2.2 can be shown. Lemma 2.2: If the radius of each grain is scaled by a factor of s and $\Delta$ is scaled accordingly, then the covariance does not change: $C_B(p, s\|\Delta\|, sr_i) = C_B(p, \|\Delta\|, r_i)$.

The variance $\mathrm{Var}\{1_B(p)\}$ can be obtained from Equation 4 if $\Delta=0$. In conclusion, the inventors have selected the parameter of the Poisson process so that the expected value at a point is equal to the gray level of the pixel that contains the point. The second order statistics in combination with a lowpass filter, which are described below, are the cause of the resulting film grain effect.

As discussed, the inhomogeneous Boolean model generates a binary signal in $\mathbb{R}^2$, and then a continuous filter is applied before the pixels of the output image are estimated. The filtered Boolean model evaluated at p is given by:

Equation 6

$$\tilde{B}(p) = \phi * 1_B(p) = \int_{\mathbb{R}^2} \phi(p-t) 1_B(t) dt$$

The linearity of convolution can be used to derive the following statistics of the filtered Boolean model:

Equation 7

$$\mathbb{E}\{\tilde{B}(p)\} = \int_{\mathbb{R}^2} \phi(p-t)\mathbb{E}\{1_B(t)\}dt$$

Equation 8

$$\mathrm{Cov}\{\tilde{B}(p), \tilde{B}(p+\Delta)\} = \int\int_{\mathbb{R}^4} \phi(t_1)\phi(t_2)\mathrm{Cov}\{1_B(p-t_1), 1_B(p+\Delta-t_2)\}dt_1 dt_2$$

Equation 9

$$\mathrm{Cov}\{\tilde{B}(p), \tilde{B}(p+\Delta)\} = \int\int_{\mathbb{R}^4} \phi(t_1)\phi(t_2+\Delta)C_B(p-t_1, \|t_1-t_2\|, r_i)dt_1 dt_2 = \int\int_{\mathbb{R}^4} \phi(t_1)\phi(t_2+\Delta)C_B(p, \|t_1-t_2\|, r_i)dt_1 dt_2$$

Included below is a derivation of the variance function and correlation function of the filtered Boolean model $\tilde{B}(p)$ based on the assumption that the Boolean model is homogeneous. Based on Equation 9, the variance $\mathrm{Var}\{\tilde{B}(p)\}$ can be written as:

Equation 10

$$\mathrm{Var}\{\tilde{B}(p)\} = \mathrm{Cov}\{\tilde{B}(p), \tilde{B}(p)\} = \int\int_{\mathbb{R}^4} \phi(t_1)\phi(t_2)C_B(p, \|t_1-t_2\|, r_i)dt_1 dt_2$$

The integration in $\mathbb{R}^4$ can be simplified into two integrations in $\mathbb{R}^2$ by the following variable substitution: $q_1=t_1+t_2$ and $q_2=t_1-t_2$. First, it is noted that $C_B$ depends only on the different $t_1-t_2$. Second, one can also express the product of the Gaussian filters in terms of $q_1$ and $q_2$, as follows:

Equation 11

$$\phi(t_1)\phi(t_2) = \frac{1}{4\pi^2\sigma^4}e^{\frac{\|t_1\|^2+\|t_2\|^2}{2\sigma^2}} = \frac{1}{4\pi^2\sigma^4}e^{\frac{\|t_1+t_2\|^2+\|t_1-t_2\|^2}{4\sigma^2}} = \phi\left(\frac{q_1}{\sqrt{2}}\right)\phi\left(\frac{q_2}{\sqrt{2}}\right)$$

Then one can write $\mathrm{Var}\{\tilde{B}(p)\}$ as:

Equation 12

$$\mathrm{Var}\{\tilde{B}(p)\} = \frac{1}{\det(J)}\int_{\mathbb{R}^2}\phi\left(\frac{q_1}{\sqrt{2}}\right)dq_1\int_{\mathbb{R}^2}\phi\left(\frac{q_2}{\sqrt{2}}\right)C_B(p, \|q_2\|, r_i)dq_2 = \frac{2}{\det(J)}\int_{\mathbb{R}^2}\phi\left(\frac{q_2}{\sqrt{2}}\right)C_B(p, \|q_2\|, r_i)dq_2 = \frac{1}{4\pi\sigma^2}\int_{\mathbb{R}^2} e^{\frac{\|q_2\|^2}{4\sigma^2}} C_B(p, \|q_2\|, r_i)dq_2,$$

where $\det(J)=4$. The last step is to convert Cartesian to polar coordinates:

Equation 13

$$\mathrm{Var}\{\tilde{B}(p)\} = \frac{1}{2\sigma^2}\int_0^{\infty} e^{-\frac{x^2}{4\sigma^2}} C_B(p, x, r_i)xdx,$$

where $C_B(p, x, r_i)$ is given in Equation 4. From Equations 4 and 13 one can see that the variance of $\tilde{B}(p)$ depends only on the input pixel value $\mu[\overline{p}]$, the standard deviation of the Gaussian filter $\sigma$, and the distribution of the grain radii $f_R(r)$.

With a derivation similar to the derivation described above, one can obtain the covariance between two points in the filtered Boolean model $\tilde{B}(p)$ as follows:

Equation 14

$$\mathrm{Cov}\{\tilde{B}(p), \tilde{B}(p+\Delta)\} = \frac{1}{2}\int_{\mathbb{R}^2}\left(\frac{q_2-2}{\sqrt{2}}\right)C_B(p, \|q_2\|, r_i)dq_2 = \frac{1}{4\pi\sigma^2}\int_{\mathbb{R}^2} e^{-\frac{\|q_2-\Delta\|^2}{4\sigma^2}} C_B(p, \|q_2\|, r_i)dq_2 = \frac{e^{-\frac{\|\Delta\|^2}{4\sigma^2}}}{4\pi\sigma^2}\int_{\mathbb{R}^2} e^{-\frac{\|q_2\|^2-2q_2^T\Delta}{4\sigma^2}} C_B(p, \|q_2\|, r_i)dq_2$$

One can also consider the ratio of the covariance and the variance:

Equation 15

$$\frac{\mathrm{Cov}\{\tilde{B}(p), \tilde{B}(p+\Delta)\}}{\mathrm{Var}\{\tilde{B}(p)\}} =$$

-continued $$e^{-\frac{\|\Delta\|^2}{4\sigma^2}} \frac{\int_{\mathbb{R}^2} e^{-\frac{\|q_2\|^2-2q_2^T\Delta}{4\sigma^2}} C_B(p, \|q_2\|, r_i)\,dq_2}{\int_{\mathbb{R}^2} e^{-\frac{\|q_2\|^2}{4\sigma^2}} C_B(p, \|q_2\|, r_i)\,dq_2} \triangleq e^{-\frac{\|\Delta\|^2}{4\sigma^2}} T(p, \|\Delta\|)$$

As discussed, with a constant radius $C_B(p, \|q_2\|)>0$ if and only if, $\|q_2\|<2\mu_r$. Assuming $\sigma_r=0$ and $2\mu_r<<\sigma$, then the exponential terms in $T(p, \|\Delta\|)$ are close to 1 because $\|q_2\|<2\mu_r<<2\sigma$, which means $T(p, \|\Delta\|)$ is nearly 1. One can also calculate the range of $T(p, \|\Delta\|)$ with different film grain parameters. FIG. 3 is a table that depicts results of calculating the range of $T(p, \|\Delta\|)$ with different film grain parameters in accordance with an illustrative embodiment. Empirically, if one allows for 3% approximation error, then one can say $T(p, \|\Delta\|)\approx 1$ if $\sigma\leq 3\mu_r$. This assumption is reasonable as long as the individual grains are not visible. Subsequently, the correlation of $\tilde{B}(p)$ can be approximated as:

$$Cor\{\tilde{B}(p), \tilde{B}(p+\Delta)\} = \frac{\text{Cov}\{\tilde{B}(p), \tilde{B}(p+\Delta)\}}{\sqrt{\text{Var}\{\tilde{B}(p)\}\text{Var}\{\tilde{B}(p+\Delta)\}}} = e^{-\frac{\|\Delta\|^2}{4\sigma^2}} \sqrt{T(p, \|\Delta\|)T(p+\Delta, \|\Delta\|)} \approx e^{-\frac{\|\Delta\|^2}{4\sigma^2}} \quad \text{Equation 16}$$

Equation 16 shows the correlation is not signal-dependent, which permits the usage of a filter to model correlation regardless of the pixel brightness $u[\bar{p}]$. The inventors have therefore derived a simplified expression for the variance and correlation. Since the filtered Boolean model is bandlimited (due to the filtering), the statistics of the output image pixels can be obtained simply by sampling the continuous statistics. As discussed below, one can use $\tilde{B}[\bar{p}]$ to represent $\tilde{B}(p)$ sampled at a pixel coordinate $\bar{p}$.

In addition to variance and correlation, one can compute other statistics of the filtered Boolean model, such as RMS granularity and Selwyn granularity. RMS granularity is defined as a function of transmittance, which is equal to $\mathbb{P}(1_B(p)=0)$ in the Boolean model. For the Boolean model, RMS granularity can be written as:

$$G_{RMS} \approx \frac{\sqrt{\text{Var}\{\tilde{B}(p)\}A(S)}}{(1-\mathbb{E}\{\tilde{B}(p)\})A(S)} \log e \quad \text{Equation 17}$$

where $\text{Var}\{\tilde{B}(p)\}$ is given by Equation 13, S is the aperture, A(S) is its area. This approximation holds when the radius of aperture S is significantly larger than the standard deviation $\sigma$ of the Gaussian filter. Selwyn granularity is the product of RMS granularity and square root of two times aperture area:

$$G_{Selwyn} = G_{RMS}\sqrt{2A(S)} \approx \frac{\sqrt{2\text{Var}\{\tilde{B}(p)\}}}{1-1\mathbb{E}\{\tilde{B}(p)\}} \log e \quad \text{Equation 18}$$

The inventors also used the standard model for synthesizing signal dependent correlated noise to generate film grain noise with the statistics of $\tilde{B}[\bar{p}]$ that were derived above.

$$y[\bar{p}] = u[\bar{p}] + n[\bar{p}] * h[\bar{p}] \quad \text{Equation 19}$$

In Equation 19, $n[\bar{p}]\sim N(0, \text{Var}\{\tilde{B}[\bar{p}]\})$, $u[\bar{p}]$ is the noise free input image, and the filter $h[\bar{p}]$ models the human visual system, the negative-to-positive optical conversion, and the correlating effects of grain overlap. Discussed below is the estimation of the filter such that $y[\bar{p}]$ has the same statistics as $\tilde{B}[\bar{p}]$.

Since the statistics of $\tilde{B}[\bar{p}]$ are derived with a homogenous assumption, one can estimate the coefficients of the filter $h[\bar{p}]$ with a noiseless input image that has a constant gray level. The statistics of $y[\bar{p}]$ are:

$$\mathbb{E}\{y[\bar{p}]\} = \sum_{\bar{k}} h[\bar{k}]\ \mathbb{E}\{n[\bar{p}-\bar{k}]\} + u[\bar{p}] = u[\bar{p}] \quad \text{Equation 20}$$

$$\begin{aligned} \text{Cov}\{y[\bar{p}], y[\bar{p}+\Delta]\} &= \text{Cov}\left\{\sum_{\bar{k}} h[\bar{p}-\bar{k}]n[\bar{k}], \sum_{\bar{k}} h[\bar{p}+\Delta-\bar{k}]n[\bar{k}]\right\} \\ &= \sum_{\bar{k}} h[\bar{p}-\bar{k}]h[\bar{p}+\Delta-\bar{k}]\,\text{Cov}\{n[\bar{k}], n[\bar{k}]\} \\ &= \text{Var}\{\tilde{B}[\bar{p}]\}\sum_{\bar{k}} h[\bar{p}-\bar{k}]h[\bar{p}+\Delta-\bar{k}] \\ &= \text{Var}\{\tilde{B}[\bar{p}]\}\sum_{\bar{k}} h[-\bar{p}+\bar{k}]h[\bar{p}+\Delta-\bar{k}] \\ &= \text{Var}\{\tilde{B}[\bar{p}]\}(h*h)[\Delta] \end{aligned} \quad \text{Equation 21}$$

$$\text{Var}\{y[\bar{p}]\} = \sum_{\bar{k}} h[\bar{k}]^2\text{Var}\{n[\bar{p}-\bar{k}]\} = \text{Var}\{\tilde{B}[\bar{p}]\}\sum_{\bar{k}} h[\bar{k}]^2 \quad \text{Equation 22}$$

In Equations 18-20, the inventors have used the fact that $h[\bar{p}]$ is isotropic.

$$Cor\{y[\bar{p}], y[\bar{p}+\Delta]\} = \frac{\text{Cov}\{y[\bar{p}], y[\bar{p}+\Delta]\}}{\text{Var}\{y[\bar{p}]\}} = \frac{(h*h)[\Delta]}{\sum_{\bar{k}} h[\bar{k}]^2} \quad \text{Equation 23}$$

Since the correlations of the rendered image $y[\bar{p}]$ in Equation 23 and the filtered Boolean model $\tilde{B}[\bar{p}]$ in Equation 16 must be equal, one can find h by equating the right-hand sides of the two equations. Since one cannot find h analytically, the inventors minimize the squared error as follows:

$$\varepsilon = \min_h \sum_{\Delta} \left(\frac{(h*h)[\Delta]}{\sum_{\bar{k}} h[\bar{k}]^2} - e^{-\frac{\|\Delta\|^2}{4\sigma^2}}\right)^2 \quad \text{Equation 24}$$

Figure 4:
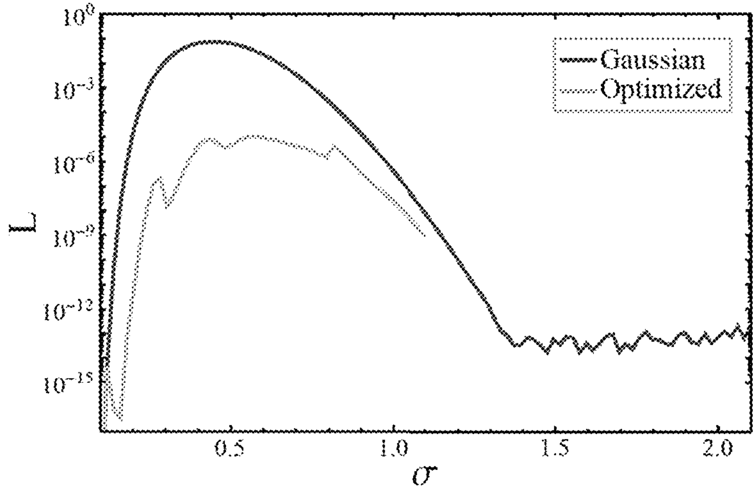
FIG. 4 shows the minimization error for different values of $\sigma$ and compares it with the value of the error when a sampled 2D Gaussian filter is used in accordance with an illustrative embodiment.

FIG. 4 shows the minimization error for different values of $\sigma$ and compares it with the value of the error when a sampled 2D Gaussian filter is used in accordance with an illustrative embodiment. It is noted that the Gaussian filter results in negligible error when $\sigma>1$. In such cases, the optimization can therefore be skipped. Since scaling $h[\bar{p}]$ by a constant does not change the correlation of $y[\bar{p}]$, one can normalize $h[\bar{p}]$ so that $\Sigma_{\bar{p}} h[\bar{p}]^2=1$. Then, based on Equation 22, it can be shown that $\text{Var}\{y[\bar{p}]\}=\text{Var}\{\tilde{B}[\bar{p}]\}$. FIG. 5 depicts a complete rendering algorithm for the system in accordance with an illustrative embodiment.

A potential problem with the algorithm of FIG. 5 is that clipping $y[\bar{p}]$ within [0,1] may affect the statistics. This can be addressed by sampling $n[\bar{p}]$ from a bounded distribution such as a truncated Gaussian, Binomial, or Beta distribution. In practice, clipping $y[\bar{p}]$ within [0,1] does not change the statistics significantly because the variance converges to 0 when the pixel value is close to 0 or 1.

Quantization is described below. Images and videos are stored with a finite number of bits. The quantization process can affect the film grain statistics, especially when the magnitude of film grain is close to the least significant bit (LSB). However, typically, the standard deviation of $\tilde{B}[\bar{p}]$ is much larger than the LSB of the quantizer, except possibly when the pixel value is close to 0 or 1, which as with the clipping discussed above, does not have a significant effect on the statistics. Thus, the quantization can be modeled as additive i.i.d. white noise with uniform distribution.

$$\tilde{B}_q[\bar{p}] = \tilde{B}[\bar{p}] + n[\bar{p}] \qquad \text{Equation 25}$$

In Equation 25, $$n[\bar{p}] \sim U\left(-\frac{1}{2^{q+1}}, \frac{1}{2^{q+1}}\right)$$

and q is the number of bits. The statistics of $\tilde{B}_q[\bar{p}]$ are:

$$\mathbb{E}\{\tilde{B}_q[\bar{p}]\} = \mathbb{E}\{\tilde{B}[\bar{p}]\} = u[\bar{p}] \qquad \text{Equation 26}$$

$$\mathrm{Var}\{\tilde{B}_q[\bar{p}]\} = \mathrm{Var}\{\tilde{B}[\bar{p}]\} + \frac{2^{-2q}}{12} \qquad \text{Equation 27}$$

$$\mathrm{Cov}\{\tilde{B}_q[\bar{p}], \tilde{B}_q[\bar{p}+\Delta]\} = \mathrm{Cov}\{\tilde{B}[\bar{p}], \tilde{B}[\bar{p}+\Delta]\} \qquad \text{Equation 28}$$

$$Cor\{\tilde{B}_q[\bar{p}], \tilde{B}_q[\bar{p}+\Delta]\} = \frac{\mathrm{Cov}\{\tilde{B}[\bar{p}], \tilde{B}[\bar{p}+\Delta]\}}{\mathrm{Var}\{\tilde{B}[\bar{p}]\} + \frac{2^{-2q}}{12}} \approx \frac{e^{-\frac{\|\Delta\|^2}{4\sigma^2}}}{1 + \frac{2^{-2q}}{12\mathrm{Var}\{\tilde{B}[\bar{p}]\}}} \qquad \text{Equation 29}$$

The last expression in Equation 29 follows from Equation 16. The expressions in Equations 25-29 are used for estimating the film grain parameters.

The parameters for the film grain model are $\mu_r$, $\sigma_r$, and the standard deviation of the Gaussian filter $\sigma$. If one uses the distribution for the film grain radius $f_R(r)$, then finding an analytical solution for the parameter estimation is intractable. Instead, it is assumed that the film grain radius is constant, that is $\sigma_r=0$, and this assumption is used to estimate $\mu_r$ and $\sigma$.

As discussed above, when the grain radius is constant, $C_B(p, \|\Delta\|)=0$ if $\|\Delta\| \geq 2\mu_r$. One can then simplify Equation 13 by substituting x with $\mu_r x$:

$$\mathrm{Var}\{\tilde{B}(p)\} = \frac{1}{2\sigma^2}\int_0^{2\mu_r} e^{-\frac{x^2}{4\sigma^2}} C_B(p, x, r_i)\,x\,dx = \frac{\mu_r^2}{2\sigma^2}\int_0^2 e^{-\frac{\mu_r^2 x^2}{4\sigma^2}} C_B(p, \mu_r x, r_i)\,x\,dx \approx \frac{\mu_r^2}{2\sigma^2}\int_0^2 C_B(p, \mu_r x, r_i)\,x\,dx \qquad \text{Equation 30}$$

In Equation 30, the last approximation assumes that $\sigma \geq 3\mu_r$. It can be shown that the relative error of this approximation is less than 3%. Now, using Lemma 2.2, one can obtain:

$$C_B(p, \mu_r x, \mu_r) = C_B(p, x, 1). \qquad \text{Equation 31}$$

Equation 31 means that one can fix grain radius $r_i=1$ for computing the integration in Equation 30. Subsequently, it follows that:

$$\mathrm{Var}\{\tilde{B}(p)\} \approx \frac{\mu_r^2}{2\sigma^2}\int_0^2 C_B(p, x, 1)\,x\,dx \qquad \text{Equation 32}$$

Given a scanned image with film grain Y, in one embodiment, a first operation is to extract the denoised image $\hat{U}$ and the noise residual $E=Y-\hat{U}$. This can be done with a denoising algorithm. The quantization effects can initially be ignored, and considered separately. The correlation of the noise residual can be estimated as:

$$\widehat{Cor}[\Delta] \triangleq Cor\{E[\bar{p}], E[\bar{p}+\Delta]\} \qquad \text{Equation 33}$$

Based on Equation 16, one can obtain an estimate of the filter standard deviation as follows:

$$\hat{\sigma} = \sqrt{-\frac{\|\Delta\|^2}{4\ln(\widehat{Cor}[\Delta])}} \qquad \text{Equation 34}$$

Then, one can estimate the variance of the noise residual, which depends on the denoised image:

$$\widehat{Var}[\bar{p}] \triangleq \mathrm{Var}\{E[\bar{p}] \mid \hat{U}[\bar{p}]\} \qquad \text{Equation 35}$$

This means that the variance is estimated separately for the points that have the same denoised image value. Then, based on Equation 32 one can get an estimate of the film grain radius:

$$\hat{\mu}_r[\bar{p}] = \sqrt{\frac{2\hat{\sigma}^2\widehat{Var}[\bar{p}]}{\int_0^2 C_B(\bar{p}, x, 1)\,x\,dx}} \qquad \text{Equation 36}$$

In Equation 36, the denominator is a function that depends only on $\hat{U}[\bar{p}]$, and can be calculated directly.

The effect of quantization is also considered. If the model is quantized to q-bits (as is the scanned image $Y[\bar{p}]$), one can use the additive white noise model. Equation 29 can be rewritten as follows:

$$\frac{e^{-\frac{\|\Delta\|^2}{4\sigma^2}}}{\widehat{Cor}[\Delta]} \approx 1 + \frac{2^{-2q}}{12\,\mathrm{Var}\{\tilde{B}[\bar{p}]\}} \qquad \text{Equation 37}$$

It is noted that the right-hand side of Equation 37 includes the variance of the unquantized model, which is not known. However, since it is not a function of $\Delta$, one can pick two values $\|\Delta_1\| \neq \|\Delta_2\|$ such that:

$$\frac{e^{-\frac{\|\Delta_1\|^2}{4\sigma^2}}}{\widehat{Cor}[\Delta_1]} = \frac{e^{-\frac{\|\Delta_2\|^2}{4\sigma^2}}}{\widehat{Cor}[\Delta_2]} \approx 1 + \frac{2^{-2q}}{12\,\mathrm{Var}\{\tilde{B}[\overline{p}]\}} \quad \text{Equation 38}$$

Solving Equation 38 for σ results in:

$$\hat{\sigma} = \text{[illegible]} \quad \text{Equation 39}$$

To estimate $\mu_r$, one can combine Equations 27 and 32 to result in:

$$\hat{\mu}_r[\overline{p}] = \text{[illegible]} \quad \text{Equation 40}$$

It is noted that the even though the estimate $\hat{\mu}_r[\overline{p}]$ depends on $\overline{p}$, in practice, it is fairly constant, allowing one to average the estimate across multiple pixels.

The inventors also conducted experiments to compare the proposed film grain rendering approach with traditional approaches, including considerations such as film grain statistics, rendering speed, and visual results. The inventors also tested the proposed parameter estimation algorithm with both constant and real-world images. For comparison to the Newson et al. approach, N=105 was selected for the Monte Carlo sampling. Details of the Monte Carlo error analysis are given below. For the film grain synthesis, the filter $h[\overline{p}]$ is optimized by minimizing Equation 24 with Adam optimizer. For parameter estimation, the inventors selected $\|\Delta\|=\|\Delta_1\|=1$ and $\|\Delta_2\|=\sqrt{2}$.

Figures 6A, 6B, 6C, 6D, 6E, 6F:
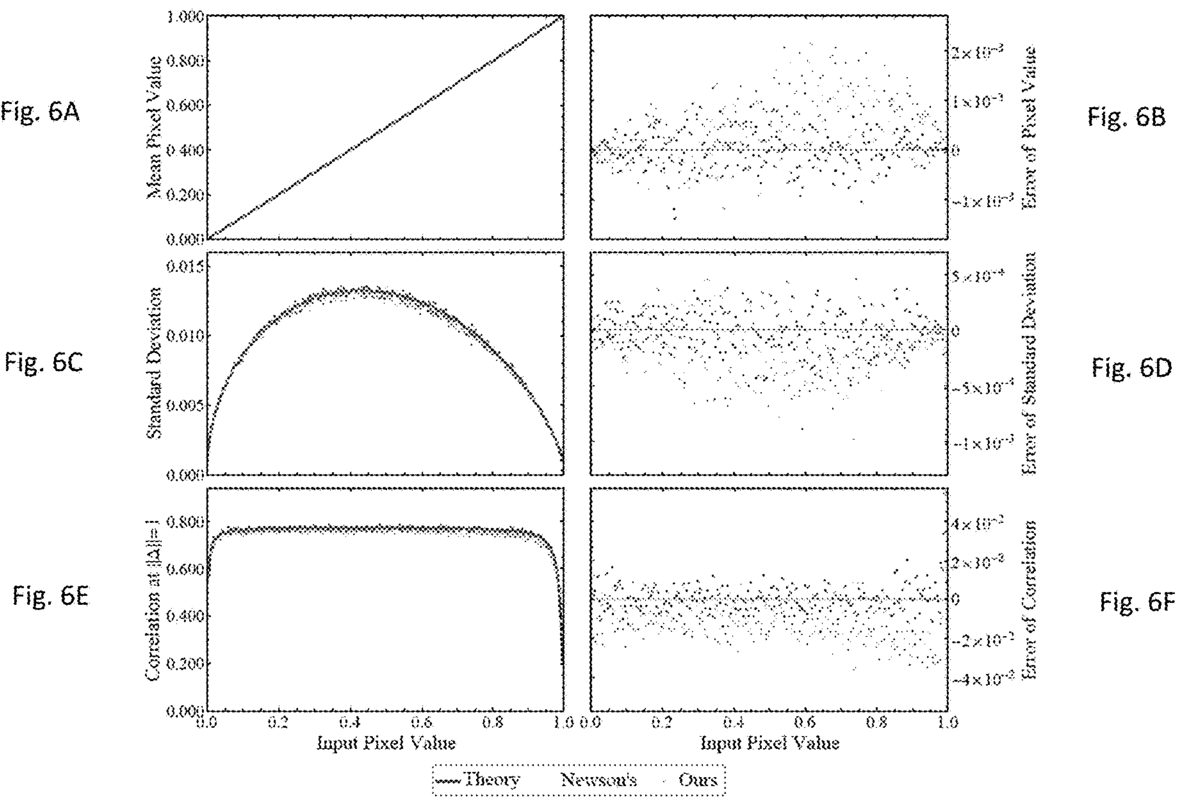
FIG. 6A depicts mean pixel value in accordance with an illustrative embodiment.
FIG. 6B depicts error of pixel value in accordance with an illustrative embodiment.
FIG. 6C depicts standard deviation in accordance with an illustrative embodiment.
FIG. 6D depicts error of standard deviation in accordance with an illustrative embodiment.
FIG. 6E depicts correlation at $\|\Delta\|=1$ in accordance with an illustrative embodiment.
FIG. 6F depicts error of correlation at $\|\Delta\|=1$ in accordance with an illustrative embodiment.

FIG. 6 compares the film grain statistics of the traditional Newson et al. approach with the proposed approach for a model with parameters $\mu_r$=0.05, $\sigma_r$=0.25, and σ=1.0. In FIG. 6, the left column shows statistics of the quantized filtered Boolean model along with statistics of the Newson et al. and the proposed approaches. The errors between the model statistics and the synthesized results are shown on the right. Specifically, FIG. 6A depicts mean pixel value in accordance with an illustrative embodiment. FIG. 6B depicts error of pixel value in accordance with an illustrative embodiment. FIG. 6C depicts standard deviation in accordance with an illustrative embodiment. FIG. 6D depicts error of standard deviation in accordance with an illustrative embodiment. FIG. 6E depicts correlation at $\|\Delta\|=1$ in accordance with an illustrative embodiment. FIG. 6F depicts error of correlation at $\|\Delta\|=1$ in accordance with an illustrative embodiment.

The curves for the model statistics are based on Equations 25-29, as shown in FIG. 6. The synthesized images are quantized to 8 bits. The statistics are computed on constant 100×100 images with values varying from 0 to 1. It is noted that the results of the proposed approach fit the theoretical curves very closely, while the results of the Newson et al. approach appear to be slightly biased, especially in the interval [0.35, 1]. The mean value is slightly higher than the input value, while the standard deviation and correlation are lower than the theoretical value. This indicates that there may be a problem in the Monte Carlo simulation.

Figures 8A, 8B, 8C, 8D:
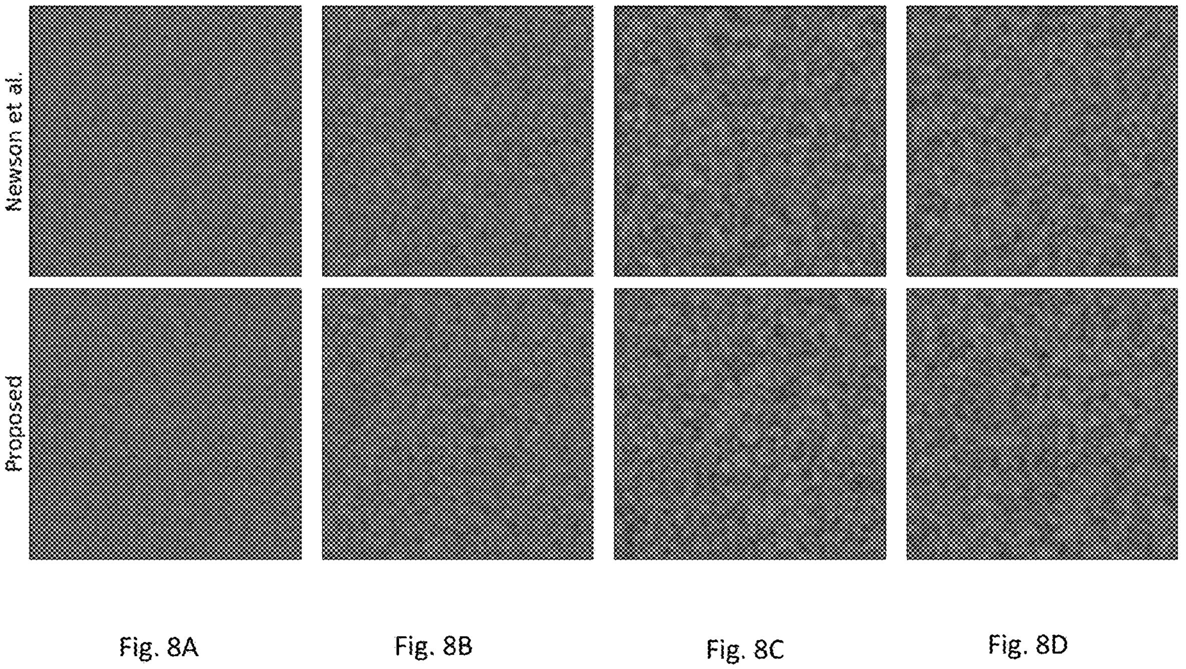
FIG. 8A shows a comparison of the proposed rendering results and the Newson et al. rendering results for variables $\mu_r=0.050$, $\sigma_r=0.0$, $\sigma=0.6$ in accordance with an illustrative embodiment.
FIG. 8B shows a comparison of the proposed rendering results and the Newson et al. rendering results for variables $\mu_r=0.100$, $\sigma_r=0.0$, $\sigma=0.8$ in accordance with an illustrative embodiment.
FIG. 8C shows a comparison of the proposed rendering results and the Newson et al. rendering results for variables $\mu_r=0.100$, $\sigma_r=0.5$, $\sigma=1.0$ in accordance with an illustrative embodiment.
FIG. 8D shows a comparison of the proposed rendering results and the Newson et al. rendering results for variables $\mu_r=0.167$, $\sigma_r=0.0$, $\sigma=1.0$ in accordance with an illustrative embodiment.

FIG. 7 is a table that compares the rendering time of the proposed and Newson et al. approaches in accordance with an illustrative embodiment. More specifically, the table of FIG. 7 shows average speed of rendering a 1080p image with a CPU or a GPU (e.g., RTX 3080), with film grain parameters $\mu_r$=0.1, $\sigma_r$=0, and σ=0.8. Since the proposed approach only estimates the film grain statistics without simulating the actual grains, it is six orders of magnitude faster. FIG. 8 depicts rendering results which show that, for constant images, the results of the proposed approach appear to be visually indistinguishable from the Newson et al. results. Specifically, FIG. 8A shows a comparison of the proposed rendering results and the Newson et al. rendering results for variables $\mu_r$=0.050, $\sigma_r$=0.0, σ=0.6 in accordance with an illustrative embodiment. FIG. 8B shows a comparison of the proposed rendering results and the Newson et al. rendering results for variables $\mu_r$=0.100, $\sigma_r$=0.0, σ=0.8 in accordance with an illustrative embodiment. FIG. 8C shows a comparison of the proposed rendering results and the Newson et al. rendering results for variables $\mu_r$=0.100, $\sigma_r$=0.5, σ=1.0 in accordance with an illustrative embodiment. FIG. 8D shows a comparison of the proposed rendering results and the Newson et al. rendering results for variables $\mu_r$=0.167, $\sigma_r$=0.0, σ=1.0 in accordance with an illustrative embodiment.

The parameter estimation algorithm was first tested on a 100*100 image with constant gray level 100/255. The noise is rendered with the proposed approach (Algorithm 1) and the Newson et al. approach. Then, film grain parameters $\mu_r$ and σ are estimated with the method described herein. For each set of film grain parameters, the experiment was repeated 100 times. FIG. 9 is a table that depicts the mean and standard deviation of the estimated parameters in accordance with an illustrative embodiment. It is noted that the estimated values are very close to the ground truth.

Figures 10A, 10B, 10C, 10D:
FIG. 10A depicts an original inhomogeneous image in accordance with an illustrative embodiment.
FIG. 10B depicts the inhomogeneous image rendered with the proposed approach in accordance with an illustrative embodiment.
FIG. 10C depicts the inhomogeneous image rendered with the Newson et al. approach in accordance with an illustrative embodiment.
FIG. 10D shows the inhomogeneous image with estimated parameters in accordance with an illustrative embodiment.

The inventors also tested the parameter estimation algorithm on an inhomogeneous image with the same experimental setup mentioned above. FIG. 10 depicts the inhomogeneous image used to test the parameter estimation algorithm. Specifically, FIG. 10A depicts an original inhomogeneous image in accordance with an illustrative embodiment. FIG. 10B depicts the inhomogeneous image rendered with the proposed approach in accordance with an illustrative embodiment. FIG. 10C depicts the inhomogencous image rendered with the Newson et al. approach in accordance with an illustrative embodiment. FIG. 10D shows the inhomogeneous image with estimated parameters in accordance with an illustrative embodiment.

When the image is rendered with the proposed algorithm, only the pixels with denoised image values in the range [0.1, 0.9] are used for parameter estimation. When the image is rendered with the Newson et al. approach, only the pixels with denoised image values in the interval [0.1, 0.35] are used for parameter estimation. This is because, as discussed above, there is a bias in the interval [0.35, 1.0]. FIG. 11 is a table that includes results of the parameter estimation algorithm on the inhomogeneous image in accordance with an illustrative embodiment. It is noted that the estimation is very accurate when the parameters are estimated from the proposed film grain synthesis, but significantly less accurate when the parameters are estimated from the Newson et al. film grain synthesis. The reason is that the Newson et al. rendering algorithm uses a Monte Carlo simulation that does not assume homogencity, while the proposed synthesis does. As a result, one can see visible differences between the Newson et al. rendered image in FIG. 10C and the image rendered by the proposed approach with estimated parameters in FIG. 10D. On the other hand, the images of both FIG. 10B and FIG. 10D are of high quality and considerably sharper than that of FIG. 10C.

Figures 12A, 12B, 12C, 12D:
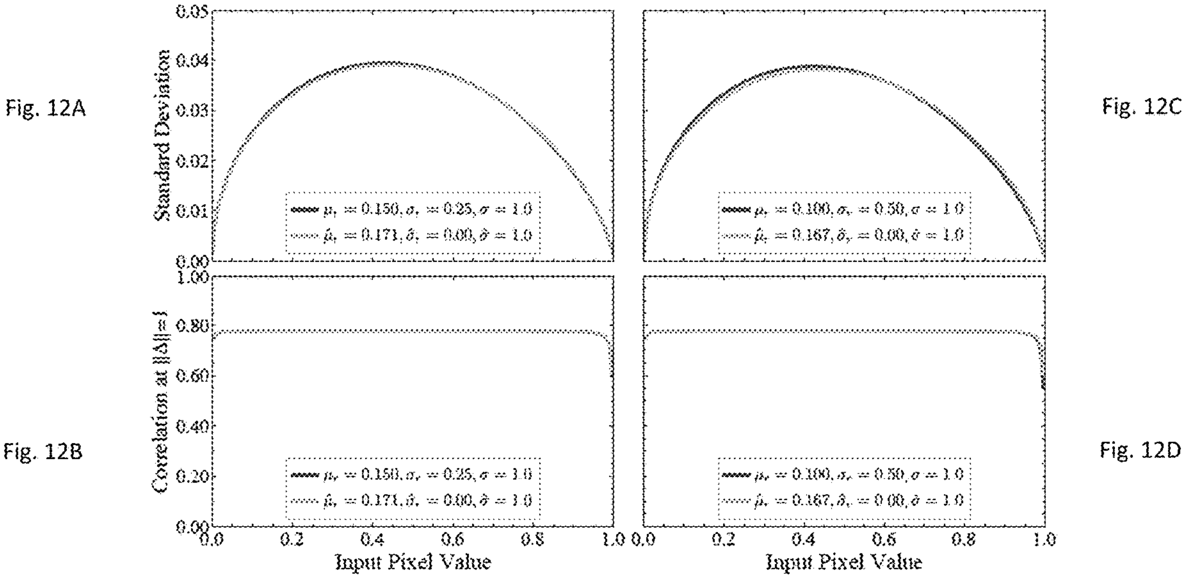
FIG. 12A depicts standard deviation for determination of film grain statistics using a first set of given and estimated parameters in accordance with an illustrative embodiment.
FIG. 12B depicts correlation for the determination of the film grain statistics using the given and estimated parameters of FIG. 12A in accordance with an illustrative embodiment.
FIG. 12C depicts standard deviation for determination of film grain statistics using a second set of given and estimated parameters in accordance with an illustrative embodiment.
FIG. 12D depicts correlation for the determination of the film grain statistics using the given and estimated parameters of FIG. 12C in accordance with an illustrative embodiment.

It is noted that the proposed parameter estimation algorithm assumes $\sigma_r$=0 but can also be applied to images rendered with $\sigma_r$>0. FIG. 12 shows two examples, where the film grain statistics (standard deviation and correlation) are computed for a given set of parameters ($\{\mu_r, \sigma_r>0, \sigma\}$) and the parameters estimated by the proposed algorithm ($\{\hat{\mu}_r, \hat{\sigma}_r=0, \hat{\sigma}\}$). FIG. 12A depicts standard deviation for determination of film grain statistics using a first set of given and estimated parameters in accordance with an illustrative embodiment. FIG. 12B depicts correlation for the determination of the film grain statistics using the given and estimated parameters of FIG. 12A in accordance with an illustrative embodiment. FIG. 12C depicts standard deviation for determination of film grain statistics using a second set of given and estimated parameters in accordance with an illustrative embodiment. FIG. 12D depicts correlation for the determination of the film grain statistics using the given and estimated parameters of FIG. 12C in accordance with an illustrative embodiment. One can observe that the statistics are very close. However, when one compares the third and fourth column of FIG. 8 (i.e., FIGS. 8C-8D) there appear to be visible differences.

Figures 13A, 13B, 13C:
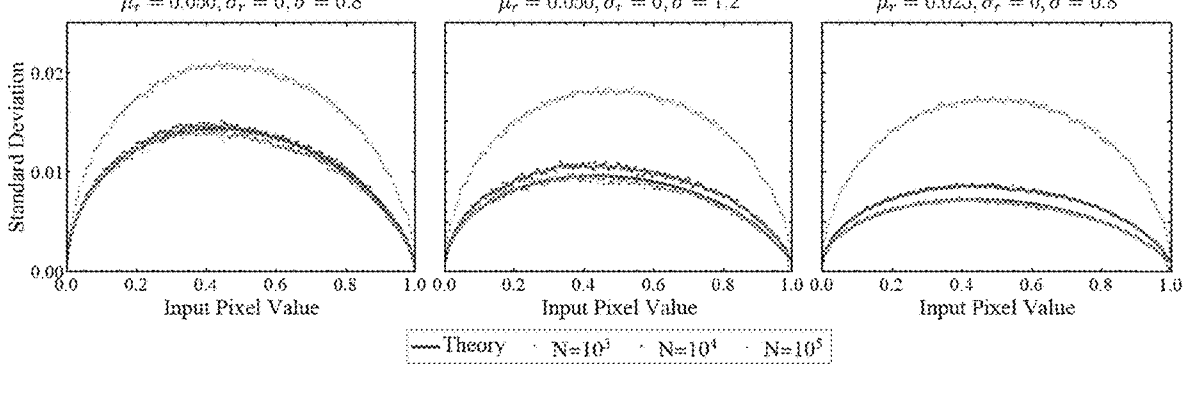
FIG. 13A depicts standard deviation (vertical axis) vs. pixel value (horizontal axis) for Newson's approach with a first set of film grain parameters and different Monte Carlo sample sizes N in accordance with an illustrative embodiment.
FIG. 13B depicts standard deviation (vertical axis) vs. pixel value (horizontal axis) for Newson's approach with a second set of film grain parameters and different Monte Carlo sample sizes N in accordance with an illustrative embodiment.
FIG. 13C depicts standard deviation (vertical axis) vs. pixel value (horizontal axis) for Newson's approach with a third set of film grain parameters and different Monte Carlo sample sizes N in accordance with an illustrative embodiment.

FIG. 13A depicts standard deviation (vertical axis) vs. pixel value (horizontal axis) for Newson's approach with a first set of film grain parameters and different Monte Carlo sample sizes N in accordance with an illustrative embodiment. FIG. 13B depicts standard deviation (vertical axis) vs. pixel value (horizontal axis) for Newson's approach with a second set of film grain parameters and different Monte Carlo sample sizes N in accordance with an illustrative embodiment. FIG. 13C depicts standard deviation (vertical axis) vs. pixel value (horizontal axis) for Newson's approach with a third set of film grain parameters and different Monte Carlo sample sizes N in accordance with an illustrative embodiment.

Thus, the inventors have derived film grain statistics based on the filtered Boolean model under a homogeneity assumption. Based on these statistics, an efficient film grain synthesis algorithm was designed that produces a reasonable approximation of film grain synthesized with the Newson et al. Monte Carlo based synthesis, at six orders of magnitude faster rendering time. Also included herein are proposed formulas for estimating the film grain parameters from a scanned film grain image. Since the proposed film grain rendering algorithm relies on second order statistics, it assumes that the individual grains are not visible ($\sigma \geq 3\mu_r$). When the grains are visible, the Newson et al. Monte Carlo simulation can be used.

A possible limitation of the proposed system is that the film grain statistics are derived based on a homogeneity assumption, which implies that the rendering and parameter estimation algorithms are less accurate when tested on inhomogeneous images. Second, the estimation algorithm assumes constant film grain radius, which may also have an effect on the film grain appearance. Conversely, the proposed approach produces considerably sharper images than the Newson et al. approach and other traditional approaches.

While many embodiments described herein focus on film grain rendering and parameter estimation on grayscale images, it is important to understand that the model can also be extended to color film grain. This can be done in various ways. First, assuming the RGB channels are independent, Equation 2 can be applied to each channel separately. Second, Equation 2 can be modified to model the color correlation:

$$\begin{bmatrix}1\\1\\1\end{bmatrix} - M\begin{bmatrix}\mathbb{P}(1^r_B(p)=0)\\ \mathbb{P}(1^g_B(p)=0)\\ \mathbb{P}(1^b_B(p)=0)\end{bmatrix} = \begin{bmatrix}u^r[\overline{p}]\\ u^g[\overline{p}]\\ u^b[\overline{p}]\end{bmatrix}, \quad \text{Equation 41}$$

where $$1^r_B(p),\ 1^g_B(p),\ \text{and}\ 1^b_B(p)$$

are the indicator functions of the Boolean model B at the three color layers of the film, $u^r[\overline{p}]$, $u^g[\overline{p}]$, and $u^b[\overline{p}]$ are the corresponding pixel values, and M is a 3×3 matrix whose elements describe the percentage of light that passes through the film and is absorbed by the digital sensors. The values of M can be estimated if the spectral sensitivity of the scanning light source, the film dye, and the digital sensor are given by data sheets. Solving Equation 41, the transmittance of the film layers can be obtained from the pixel values. The proposed method is then applied separately to each film layer.

Included below is a proof of Lemma 2.2, which was described herein. Also included below are formulas relating to the error between the LHS and RHS of Equation 30. Additionally, included below is an error analysis of the Monte Carlo algorithm.

Regarding Lemma 2.2, similar to the process of Equation 4, once can add the explicit dependence on $r_i$ for $\lambda(p)$ and $\gamma(\|\Delta\|)$. Then one can scale the grain radius $r_i$ by s and $\|\Delta\|$ is scaled accordingly:

$$\begin{aligned}\lambda(p, sr_i) &= \frac{1}{\pi\mathbb{E}\{sr_i^2\}}\log\left(\frac{1}{1-u[\overline{p}]}\right)\\ &= \frac{1}{\pi s^2\mathbb{E}\{r_i^2\}}\log\left(\frac{1}{1-u[\overline{p}]}\right)\\ &= \frac{1}{s^2}\lambda(p, r_i)\end{aligned} \quad \text{Equation 42}$$

$$\gamma(s\|\Delta\|, sr_i) = \int_{\frac{s\|\Delta\|}{2}}^{\infty}\left(2x^2\cos^{-1}\left(\frac{s\|\Delta\|}{2x}\right) - \frac{s\|\Delta\|}{2}\sqrt{4x^2 - s^2\|\Delta\|^2}\right)dF_R\left(\frac{x}{s}\right) \quad \text{Equation 43}$$

Substituting x with sx, one obtains:

$$\begin{aligned}\gamma(s\|\Delta\|, sr_i) &= \int_{\frac{s\|\Delta\|}{2}}^{\infty}\left(2s^2x^2\cos^{-1}\left(\frac{\|\Delta\|}{2x}\right) - \frac{s^2\|\Delta\|}{2}\sqrt{4x^2 - \|\Delta\|^2}\right)dF_R(x)\\ &= s^2\int_{\frac{s\|\Delta\|}{2}}^{\infty}\left(2x^2\cos^{-1}\left(\frac{\|\Delta\|}{2x}\right) - \frac{\|\Delta\|}{2}\sqrt{4x^2 - \|\Delta\|^2}\right)dF_R(x)\\ &= s^2\gamma(\|\Delta\|, r_i)\end{aligned} \quad \text{Equation 44}$$

Combining Equations 42 and 44 results in:

$$\lambda(p, sr_i)\gamma(s\|\Delta\|, sr_i) = \lambda(p, r_i)\gamma(\|\Delta\|, r_i) \quad \text{Equation 45}$$

Based on the definition of $C_B(p, \|\Delta\|, r_i)$ in Equation 4, Equation 45 is the same as:

$$C_B(p, s\|\Delta\|, sr_i) = C_B(p, \|\Delta\|, r_i) \quad \text{Equation 46}$$

The error between LHS and RHS of Equation 30 is discussed below. When the grain radius is constant $\mu_r$, $C_B(p, \|\Delta\|, r_i)$ defined in Equation 4 can be simplified to following format:

$$C_B(p, \|\Delta\|, \mu_r) = (1-u[\overline{p}])^{w\left(\frac{\|\Delta\|}{\mu_r}\right)} - (1-u[\overline{p}])^2, \text{ where} \quad \text{Equation 47}$$

$$w(x) = \begin{cases} 2 & 2 \le x \\ 1 + \dfrac{x\sqrt{4-x^2} + 4\sin^{-1}\left(\frac{x}{2}\right)}{2\pi} & 0 \le x < 2 \end{cases} \quad \text{Equation 48}$$

One can now proceed to estimate the relative error ε of the approximation in Equation 30.

$$\varepsilon = \frac{\int_0^2 C_B(p, \mu_r x, \mu_r)xdx - \int_0^2 e^{-\frac{\mu_r^2 x^2}{4\sigma^2}} C_B(p, \mu_r x, \mu_r)xdx}{\int_0^2 C_B(p, \mu_r x, \mu_r)xdx} = \quad \text{Equation 49}$$

$$\frac{\int_0^2 \left(1 - e^{-\frac{x^2}{4\left(\frac{\sigma}{\mu_r}\right)^2}}\right) C_B(p, \mu_r x, \mu_r)xdx}{\int_0^2 C_B(p, \mu_r x, \mu_r)xdx} <$$

$$\frac{1}{4}\left(\frac{\mu_r}{\sigma}\right)^2 \frac{\int_0^2 C_B(p, \mu_r x, \mu_r)x^3 dx}{\int_0^2 C_B(p, \mu_r x, \mu_r)xdx}$$

Considering the property of $C(p,x) \triangleq C_B(p, \mu_r x, \mu_r)/C_B(p, 0, \mu_r)$, it can be determined that:

$$C(p, x) \le \lim_{u[\overline{p}] \to 0^+} C(p, x) = 2 - w(x) \quad \text{Equation 50}$$

Furthermore, $$D(p, x) \triangleq \frac{C(p, x)}{2 - w(x)}$$

is monotonically non-increasing when $0 \le u[\overline{p}] \le 1$ and $D(p,2)=0$. Now one can write ε in terms of $$D'(p, x) \triangleq \frac{\partial D(p, x)}{\partial x}$$

as:

$$\varepsilon < \frac{1}{4}\left(\frac{\mu_r}{\sigma}\right)^2 \frac{\int_0^2 C_B(p, \mu_r x, \mu_r)x^3 dx}{\int_0^2 C_B(p, \mu_r x, \mu_r)xdx} \quad \text{Equation 51}$$

$$= \frac{1}{4}\left(\frac{\mu_r}{\sigma}\right)^2 \frac{\int_0^2 C(p, x)x^3 dx}{\int_0^2 C(p, x)xdx}$$

$$= \frac{1}{4}\left(\frac{\mu_r}{\sigma}\right)^2 \frac{\int_0^2 D(p, x)(2-w(x))x^3 dx}{\int_0^2 D(p, x)(2-w(x))xdx}$$

$$= \frac{1}{4}\left(\frac{\mu_r}{\sigma}\right)^2 \frac{\int_0^2 \left(\int_x^2 -D'(p, x')dx'\right)(2-w(x))x^3 dx}{\int_0^2 \left(\int_x^2 -D'(p, x')dx'\right)(2-w(x))xdx}$$

$$= \frac{1}{4}\left(\frac{\mu_r}{\sigma}\right)^2 \frac{\int_0^2 \left(\int_0^{x'} (2-w(x))x^3 dx\right)(-D'(p, x')dx'}{\int_0^2 \left(\int_0^{x'} (2-w(x))xdx\right)(-D'(p, x'))dx'},$$

and because $-D'(p, x')$ is always non-negative, this results in:

$$\varepsilon < \max_{0 \le x' \le 2} \frac{1}{4}\left(\frac{\mu_r}{\sigma}\right)^2 \frac{\int_0^{x'} (2-w(x))x^3 dx}{\int_0^{x'} (2-w(x))xdx} \quad \text{Equation 52}$$

One can also utilize the following definition:

$$g(x') \triangleq \frac{\int_0^{x'} (2-w(x))x^3 dx}{\int_0^{x'} (2-w(x))xdx}, \; x' \in [0, 2] \quad \text{Equation 53}$$

The derivative of $g(x')$ is:

$$g'(x') = \frac{(2-w(x'))x' \int_0^{x'} (2-w(x'))(xx'^2 - x^3)dx}{\left[\int_0^{x'} (2-w(x))xdx\right]^2} \quad \text{Equation 54}$$

Because $g'(x')$ is non-negative when $x' \in [0,2]$, in Equation 52 the upper limit of ε is reached when $x'=2$, and $$\varepsilon < \frac{1}{4}\left(\frac{\mu_r}{\sigma}\right)^2 g(2) < \frac{1}{4}\left(\frac{\mu_r}{\sigma}\right)^2 \quad \text{Equation 55}$$

An error analysis of the Monte Carlo algorithm is included below. The Monte Carlo approach in draws N i.i.d. samples $\{\xi_i, i=1, 2, \ldots, N\}$ from a Gaussian distribution with mean 0 and variance $\sigma^2 I_2$, and approximates the result of applying a continuous Gaussian filter:

$$\lim_{N \to +\infty} \frac{1}{N} \sum_{i=1}^{N} 1_B(\overline{p} - \xi_i) = \mathbb{E}_{\xi}\{1_B(\overline{p} - \xi)\} = \int_{\mathbb{R}^2} \phi(t) 1_B(\overline{p} - t) dt \quad \text{Equation 56}$$

One can denote:

$$Y = \int_{\mathbb{R}^2} \phi(t) 1_B(\overline{p} - t)\, dt \quad \text{Equation 57}$$

as the target value of Monte Carlo algorithm, where Y is a random variable with variance $$\sigma_Y^2$$

equals to (13). One can also denote:

$$\hat{Y} = \frac{1}{N} \sum_{i=1}^{N} 1_B(\overline{p} - \xi_i) \quad \text{Equation 58}$$

as the result of Monte Carlo simulation. Assuming $1_B(\overline{p} - \xi_i)$ are i.i.d. samples, the central limit theorem provides that:

$$\hat{Y} = Y + X, \quad \text{Equation 59}$$

where X is an independent zero mean Gaussian noise caused by the Monte Carlo algorithm. One can write $$\sigma_X^2$$

as follows:

$$\sigma_X^2 = \text{Var}\left\{\frac{1}{N} \sum_{i=1}^{N} 1_B(\overline{p} - \xi_i)\right\} = \frac{1}{N} \text{Var}\{1_B(\overline{p} - \xi_i)\} = \frac{u[\overline{p}](1 - u[\overline{p}])}{N} \le \frac{1}{4N} \quad \text{Equation 60}$$

In one embodiment, N is chosen as 800 such that $\sigma_x \approx 0.018$, which seems like a reasonable trade-off between speed and precision. However, an accurate simulation of film grain requires $\sigma_Y >> \sigma_X$ such that the simulated film grain variance $$\sigma_{\hat{Y}}^2$$

converges to $$\sigma_Y^2.$$

FIG. 12 shows that the value of $\sigma_Y$ is around $10^{-2}$, and assuming 2.5% error in noise variance is allowed, the result is:

$$\max\{\sigma_X^2\} = \frac{1}{4N} \le \frac{\sigma_Y^2}{40} \approx \frac{10^{-4}}{40} \Rightarrow N \gtrsim 10^5 \quad \text{Equation 61}$$

The conclusion in Equation 61 can be verified by the empirical results in FIG. 12.

In an illustrative embodiment, any of the operations or calculations described herein can be performed by a computing system that includes a processor, a memory, a user interface (e.g., display), a transceiver (receiver and/or transmitter), etc. The operations can be stored as computer-readable instructions in the memory. Upon execution by the processor of the computer-readable instructions, the computing system performs the operations, calculations, etc. described herein.

Figure 14:
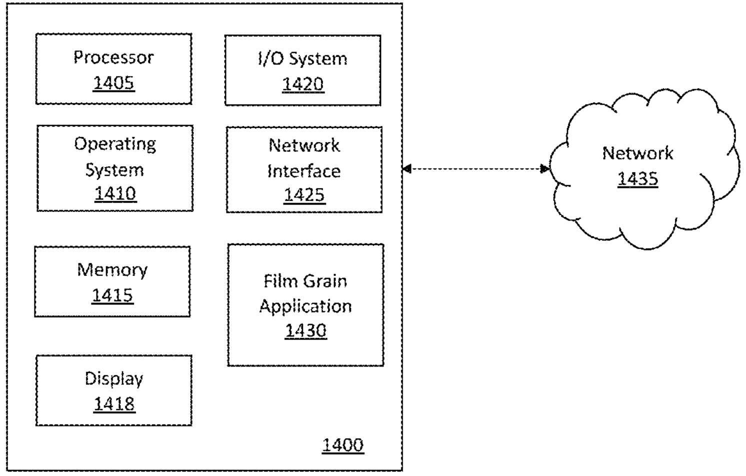
FIG. 14 depicts a computing system for performing film grain parameter estimation and film grain rendering in accordance with an illustrative embodiment.

As an example, FIG. 14 depicts a computing system 1400 for performing film grain parameter estimation and film grain rendering in accordance with an illustrative embodiment. In the depicted embodiment, the computing system 1400 is in communication with a network 1435, which can be any type of computer network. In an illustrative embodiment, the computing system 1400 receives data through the network 1435, such as images/video that is to be re-rendered with film grain.

The computing system 1400 includes a processor 1405, an operating system 1410, a memory 1415, a display 1418, an input/output (I/O) system 1420, a network interface 1425, and a film grain application 1430. In alternative embodiments, the computing system 1400 may include fewer, additional, and/or different components. The components of the computing system 1400 communicate with one another via one or more buses or any other interconnect system. The computing system 1400 can be any type of computing system (e.g., smartphone, tablet, laptop, desktop, etc.), including a dedicated standalone computing system that is designed to perform the film grain computations and/or rendering.

The processor 1405 can be in electrical communication with and used to control any of the system components described herein. For example, the processor can be used to execute the film grain application 1430, process received image data, run/solve algorithms, perform rendering, display results, etc. The processor 1405 can be any type of computer processor known in the art, and can include a plurality of processors and/or a plurality of processing cores. The processor 1405 can include a controller, a microcontroller, an audio processor, a graphics processing unit, a hardware accelerator, a digital signal processor, etc. Additionally, the processor 1405 may be implemented as a complex instruction set computer processor, a reduced instruction set computer processor, an x86 instruction set computer processor, etc. The processor 1405 is used to run the operating system 1410, which can be any type of operating system.

The operating system 1410 is stored in the memory 1415, which is also used to store programs, received measurements/data, network and communications data, peripheral component data, the film grain application 1430, and other operating instructions. The memory 1415 can be one or more memory systems that include various types of computer memory such as flash memory, random access memory (RAM), dynamic (RAM), static (RAM), a universal serial bus (USB) drive, an optical disk drive, a tape drive, an internal storage device, a non-volatile storage device, a hard disk drive (HDD), a volatile storage device, etc. In some embodiments, at least a portion of the memory 1415 can be in the cloud to provide cloud storage for the system. Similarly, in one embodiment, any of the computing components described herein (e.g., the processor 1405, etc.) can be implemented in the cloud such that the system can be run and controlled through cloud computing.

The I/O system 1420 is the framework which enables users and peripheral devices to interact with the computing system 1400. The display 1418 can include a touch screen in some embodiments, and the touch screen can be part of the I/O system 1420 that allows a user to make selections, control sub-systems, view video, etc. The display 718 can be any type of display, including a monitor, projector, virtual reality headset, etc., and can be used to present user interface screens, original video, video with added film grain, etc. The I/O system 1420 can also include one or more speakers, one or more microphones, a keyboard, a mouse, one or more buttons or other controls, etc. that allow the user to interact with and control the computing system 1400. The I/O system 1420 also includes circuitry and a bus structure to interface with peripheral computing devices such as power sources, universal service bus (USB) devices, data acquisition cards, peripheral component interconnect express (PCIe) devices, serial advanced technology attachment (SATA) devices, high definition multimedia interface (HDMI) devices, proprietary connection devices, etc.

The network interface 1425 includes transceiver circuitry (e.g., a transmitter and a receiver) that allows the computing system 1400 to transmit and receive data to/from other devices such as remote computing systems, servers, websites, etc. The network interface 1425 enables communication through the network 1435, which can be one or more communication networks. The network 1435 can include a cable network, a fiber network, a cellular network, a wi-fi network, a landline telephone network, a microwave network, a satellite network, etc. The network interface 1425 also includes circuitry to allow device-to-device communication such as Bluetooth® communication.

The film grain application 1430 can include software and algorithms in the form of computer-readable instructions which, upon execution by the processor 1405, performs any of the various operations described herein such as receiving video to which film grain is to be added, determining film grain parameters, modeling film grain, synthesizing the film grain as noise, rendering the video to include the film grain, etc. The film grain application 1430 can utilize the processor 1405 and/or the memory 1415 and/or the display 1418 as discussed above. In an alternative implementation, the film grain application 1430 can be remote or independent from the computing system 1400, but in communication therewith.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method for film grain rendering, the method comprising:

receiving, by a computing system, a first image;

modeling, by a processor of the computing system, film grains for the first image;

identifying, by the processor, one or more portions of the first image that have a constant value;

deriving, by the processor, second order statistics for the film grains, wherein deriving the second order statistics is based on the one or more portions of the first image that have the constant value;

synthesizing, by the processor and based at least in part on the second order statistics, the film grains as correlated signal dependent noise; and rendering, by the processor, a second image that corresponds to the first image and that includes the synthesized film grains.

2. The method of claim 1, wherein the second order statistics for the film grains include variance.

3. The method of claim 1, wherein the second-order statistics for the film grains include correlation.

4. The method of claim 1, wherein the deriving is performed based on an assumption that the first image has a constant value.

5. The method of claim 1, further comprising deriving, by the processor, one or more formulas for film grain parameter estimation based at least in part on the derived second order statistics.

6. The method of claim 5, wherein the one or more formulas for film grain parameter estimation are based on an assumption of constant film grain radius.

7. The method of claim 1, wherein the film grains are modeled as a filtered Boolean model.

8. The method of claim 1, wherein the synthesizing further comprises uniformly distributing the film grains throughout the first image.

9. The method of claim 8, wherein each of the film grains includes a grain center, and wherein the grain centers are distributed in accordance with a Poisson process that is based at least in part on a parameter that controls grain density.

10. The method of claim 9, wherein each of the film grains includes a radius, and wherein the grain radii are identically and independently distributed throughout the first image.

11. The method of claim 10, wherein the radii are identically and independently distributed throughout the first image in accordance with a density function, and wherein the radii are distributed independent of the grain centers.

12. A system for rendering film grain, the system comprising:

a memory that stores a first image; and a processor operatively coupled to the memory, wherein the processor is configured to:

model film grains for the first image;

identify one or more portions of the first image that have a constant value;

derive second order statistics for the film grains, wherein the second order statistics are derived based on the one or more portions of the first image that have the constant value;

synthesize, based at least in part on the second order statistics, the film grains as correlated signal dependent noise; and render a second image that corresponds to the first image and that includes the synthesized film grains.

13. The system of claim 12, wherein the second order statistics for the film grains include variance and correlation.

14. The system of claim 12, wherein the processor is further configured to derive one or more formulas for film grain parameter estimation based at least in part on the derived second order statistics.

15. The system of claim 14, wherein the one or more formulas for film grain parameter estimation are based on an assumption of constant film grain radius.

16. The system of claim 12, wherein the processor models the film grains as a filtered Boolean model.

17. The system of claim 12, wherein each of the film grains includes a grain center, and wherein the processor distributes the grain centers in accordance with a Poisson process.

18. The system of claim 17, wherein each of the film grains includes a radius, and wherein the processor identically and independently distributes the radii throughout the first image.

19. The system of claim 18, wherein the radii are distributed throughout the first image in accordance with a density function, and wherein the radii are distributed independent of the grain centers.

* * * * *